United States Patent Office 2,800,453
Patented July 23, 1957

2,800,453

LIQUID HYDROCARBON COMPOSITIONS

Arnold A. Bondi, Oakland, and Lawrence B. Scott, Lafayette, Calif., assignors to Shell Development Company, New York, N. Y., a corporation of Delaware No Drawing. Application November 18, 1955,
Serial No. 547,864

16 Claims. (Cl. 252—51.5)

This invention relates to improved liquid hydrocarbon compositions, and particularly to improved fuel oil and mineral lubricating oil compositions, containing a particular type of additive which imparts to them enhanced properties of color stability, oxidation resistance, dispersency, and pour point.

Until recently, fuel oils and lubricating oils were generally doped with polyvalent metal salts or soaps such as polyvalent metal organic sulfonates, carboxylates, phenates, phosphates, thiocarbamates, and the like in order to impart to the oil one or more of the above and other properties. Although some of the previously proposed classes of ash-forming additives are good anti-clogging agents in fuel oils, they are readily leached out by water, and they lack the property in inhibiting oxidation or color deterioration of the oil during use or storage. Lubricating oils containing various proposed ash-forming additives, such as polyvalent metal organic sulfonates lack desired cold temperature detergent properties and the additive is depleted rapidly during use.

It has now been found that certain physical as well as some chemical properties of the heavier than gasoline liquid hydrocarbons such as fuel oil and lubricating oil are markedly improved by the use of an oil-soluble high molecular weight polyalcoholic polymeric compound obtained by substantially completely hydrolyzing a copolymer of a long chain alpha olefinic hydrocarbon (normal or branched-chain) containing a terminal —CH=CH$_2$ group and containing at least 10 carbon atoms with a vinyl ester of a lower fatty acid having up to five carbon atoms, such as vinyl acetate, vinyl proprionate, vinyl isobutyrate, or vinyl isovalerate. The final product is a macromolecular organic compound containing essentially a plurality of recurring alkyl-1,2-ethylene and hydroxy-1,2-ethylene units joined together in chain-like manner, wherein the alkyl radicals contain at least 8 carbon atoms; and there may be a minor proportion of alkanoyloxy-1,2-ethylene units as essentially the only other polar containing group. The ratio of the non-acidic oxygen containing units (hydroxyl- and alkanoyloxy-) 1,2-ethylene to the alkyl-1,2-ethylene units is from about 1 to about 5 and the average molecular weight of the final product is from about 4,000 to about 50,000. The non-acidic oxygen-containing polar groups present in the final product are predominantly hydroxyl, being at least 80°% hydroxyl, preferably at least 90% or as high as 99% of the non-acidic oxygen-containing polar mixture.

It is believed that the polar-containing and non-polar units are substantially uniformly distributed throughout the length of the hydrocarbon chain in accordance with the respective molecular proportions of the olefin and ester monomers utilized in the preparation with some randomness from exact regularity. Furthermore, even where two polar containing ethylene units are bound directly the polar groups in general are attached to nonadjacent carbon atoms.

The alpha olefins suitable to form the copolymers include monomers having a single terminal ethylenic group and containing from 10 to 40 carbon atoms and preferably from 12 to 30 carbon atoms such as α-decene, α-hexadecene, α-tetradecene, α-pentadecene, α-heptadecene, α-octadecene, α-nonadecene, α-eicosene, α-docosene, α-triacontene, and mixtures thereof. Mixtures of α-olefins containing from 12 to 20, and preferably 16 to 18 carbon atoms obtained by pyrolysis of paraffin waxes, are particularly suitable and represent a readily available economic material.

The unsaturated esters which can be used to make the copolymer can be exemplified by vinyl ester of lower saturated fatty acids such as vinyl acetate, vinyl propionate, vinyl butyrate, vinyl isovalerate, and mixtures thereof.

Normally, these reactants are copolymerized in the presence of a catalyst. Catalysts which are suitable for these copolymerizations include various organic peroxides, such as aliphatic, aromatic, heterocyclic, and alicyclic peroxides such as diethyl peroxide, tertiary butyl hydroperoxide, dibenzoyl peroxide, dimethylthienyl peroxide, dicyclohexyl peroxide, dilauroyl peroxide, di tert butyl peroxide, and urea peroxide. These specific peroxides are mentioned by way of nonlimiting examples of suitable organic peroxides.

The identity and proportion of catalyst selected and the temperature employed in the copolymerization can be varied to produce products having different molecular weights as desired. Thus, if one desires lower molecular weight products, one might select a higher reaction temperature, such as of the order of 150° C. to 300° C., and select a catalyst that has a satisfactory decomposition rate within that range of temperature. When a higher molecular weight product is desired, a lower temperature range may be used, such as 50° C. to 100° C., and a catalyst having a satisfactory decomposition rate within that range may be selected. In general, it is preferred to employ temperatures within the range of 80° C. to 200° C.

and catalysts which are effective within that range.

The polymerization may be conducted in the presence or absence of air. In most cases, however, it has been found desirable to conduct the polymerization in the absence of air, e. g., in the presence of an inert gas such as nitrogen. Atmospheric, reduced, or superatmospheric pressure may be employed.

At the end of the polymerization, unreacted monomer is removed, usually suitably by distillation.

The conversion of the ester groups to hydroxyl groups can be accomplished by hydrolysis or alcoholysis. Hydrolysis or alcoholysis can be accomplished by the methods described in U. S. Patent 2,421,971. Hydrolysis may be by saponification, with aqueous alkali, such as sodium hydroxide, or by alcoholysis reaction wherein the copolymer is treated with a lower alkanol or mixture of a lower alkanol and a suitable base catalyst, such as sodium ethoxide.

After the saponification or alcoholysis, the mixture is treated to remove materials other than the desired product, such as by distillation to remove volatile materials and by water-soluble salt impurities, such as sodium acetate. It is particularly important to remove water-soluble salts in order to obtain copolymers which can be used as additives for fuel oils without forming undesirable haze.

The following examples are given as illustrative of suitable products and their preparation:

EXAMPLE I 2.5 moles of vinyl acetate and 1 mole of a mixture of $C_{16}$ to $C_{18}$ alpha olefins, predominantly $C_{18}$ olefin, and 1% ditertiary butyl peroxide were placed in a stainless steel bomb and the air replaced with nitrogen. The bomb was heated to 115° C. until there was about 90% conversion. The product was topped at 185° C. at 1 mm. Hg. pressure.

The polymer product was then mixed with methanol and sodium methylate so as to effect a 95% conversion of the acetate groups to hydroxyl groups. This was accomplished by adding 10 parts of methanol, 35 parts of isopropyl alcohol and 1 part of sodium methylate per 50 parts of the copolymer and neutralizing with stirring for 8 hours at 70° C. Sodium acetate was then removed by washing twice with 1 part of a 33% isopropyl alcohol-water mixture. After settling, the lower layer was drained off and all low boiling components stripped off at a temperature of 110° C. at 90 mm. Hg. The resulting copolymer was a sticky yellow solid. Analysis:

Mol ratio of acetate plus alcohol groups to olefin $C_{14}$–$C_{16}$ alkyl groups _____ 5/1
Mol wt _____ 2700
Mol ratio of hydroxyl to acetate groups _____ 19/1

Following essentially the procedure of Example I, other products were prepared as Examples II through XXI in accordance with the following tabulation, showing the polymerization catalyst, polymerization temperature, ratio of vinyl ester to olefin used and ratio in the product, degree of hydrolysis of the ester groups and average molecular weight.

| Example | Catalyst | Temperature, ° C. | Vinyl Acetate/α-Olefin Ratio in Monomer | Vinyl Acetate/α-Olefin Ratio in Polymer | Degree of Hydrolysis | Mol WT.[1] |
|---|---|---|---|---|---|---|
| II | ditertiarybutyl-peroxide | 115 | 2.5/1 ($C_{16}$–$C_{18}$ Olefin) | 5 | 92 | 27,000 |
| III | do | 115 | 1.9/1 ($C_{16}$–$C_{18}$ Olefin) | 2.6 | 95 | 11,000 |
| IV | do | 115 | 1/1 ($C_{16}$–$C_{18}$ Olefin) | 2 | 95 | 8,000 |
| V | do | 130 | 2.5/1 ($C_{16}$–$C_{18}$ Olefin) | 4.9 | 92 | 20,000 |
| VI | do | 140 | do | 5 | 95 | 20,000 |
| VII | do | 140 | 4.0/1 ($C_{16}$–$C_{18}$ Olefin) | 4.9 | 90 | 30,000 |
| VIII | benzoyl peroxide | 80 | 1.6/1 (octadecene) | 3.6 | 95 | 16,500 |
| IX | do | 80 | 2/1 (octadecene) | 4.06 | 97 | 20,000 |
| X | do | 110 | do | 3.4 | 88 | 8,330 |
| XI | do | 80 | do | 1.52 | 95 | 5,120 |
| XII | do | 80 | do | 1.72 | 95 | 5,710 |
| XIII | do | 80 | 2.5/1 (octadecene) | 4.1 | 95 | 20,100 |
| XIV | do | 80 | 2/1 (octadecene) | 3.89 | 97 | 14,200 |
| XV | do | 115 | 3/1 (octadecene) | 4.1 | 90 | 11,000 |
| XVI | do | 80 | 2/1 (dodecene) | 2.6 | 90 | 8,000 |
| XVII | do | 80 | 2/1 (hexadecene) | 3.1 | 90 | 8,000 |
| XVIII | dichlobenzoyl peroxide | 60 | do | 2.14 | 90 | 16,400 |
| XIX | benzoyl peroxide | 80 | 2/1 (vinylbutyrate/α-octadecene) | 2.1 | 90 | 8,000 |
| XX | do | 80 | 1/1.2 (octadecene) | 1 | 95 | 8,000 |
| XXI | do | 80 | 1/1.2 (hexadecene) | 1 | 95 | 8,000 |

[1] Mol wt. determined by light scattering technique described in Chem. Res., Vol. 40, p. 139 (1948).

The hydrocarbon oils which are improved by the incorporation of the polymeric additives of this invention are those of the heavier than gasoline liquid hydrocarbons and preferably those which have an initial boiling point of around 500° F., including various fuel oils and lubricating oils, particularly distillate fuel oils such as treated or untreated cracked fuel oils or mixtures of cracked and straight run fuel oils, usually have components normally distilling at about 500° F. and have an end distillation point of around 750° F. Fuel oils of this type include Nos. 1, 2, and 3 fuel oils, gas oils, furnace oils, burner oils, diesel fuel oils, kerosene and mixtures thereof. The lubricating oils may be obtained from paraffinic, naphthenic, asphaltic, or mixed base crude oil, as well as mixtures thereof. The viscosity of these oils may vary over a wide range such as from 50 SUS at 100° F. to 100 SUS at 210° F. The hydrocarbon lubricating oils may be blended with fixed oils such as castor oil, lard oil, and the like, and/or with synthetic lubricants such as polymerized olefins, the polyalkylene glycols such as copolymers of alkylene glycols, and alkylene oxides, organic esters, especially the polyesters, e. g., 2-ethylhexyl sebacate, dioctyl phthalate, trioctyl phosphate; polymeric tetrahydrofuran, polyalkyl polysiloxanes (silicones) e. g., dimethyl silicone polymer, and the like.

Various fuel oils are effectively improved by the present additives. They may be represented by a No. 3 fuel oil having the following properties:

ASTM end distillation point, ° F _____ 683
Flash, ° F _____ 170
Viscosity SUS at 100° F _____ 36.5
Pour point, ° F _____ —5

Various mineral lubricating oils are effectively improved by the present additives. They may be represented by an SAE 30 refined mineral oil having the following properties:

| | |
|---|---|
| Gr., °API | Min. 24.5. |
| Pour point, °F | Max. −5. |
| Flash, COC, °F | Min. 415. |
| Viscosity, SUS at 210° F | 58–63. |
| Viscosity index | 50–60. |

The polymeric additives of this invention are effective when used in very small amounts, to improve the properties of either fuel oils or lubricating oils. In general, from about 1 to 500 and preferably from about 10 to about 100 parts of the polymeric additive in one million parts (by weight) of the oil (0.001% to 0.01% wt.) is sufficient to improve fuel oils with respect to screen clogging, water leaching, color deterioration, asphaltene formation and the like. When the polymeric additive is used to improve lubricating oils, the amount can vary from about 0.01% to about 10% and preferably from about 0.1% to about 5% by weight of the oil composition.

In addition to the polymeric additives of this invention, auxiliary additives can be used in conjunction with the fuel oil or lubricating oil compositions. Such additives include fuel oil color stabilizers such as alkyl amines, e. g., tri-n-butyl amine or 2,4,6-tri(dimethylaminomethyl)-phenol; metal deactivators, e. g., N,N′-disalicylidene 1,2-diamino propane; anti-oxidants, corrosion inhibitors, and the like. The auxiliary lubricating oil additives include pour point and viscosity index modifiers such as the Acryloid polymers, anti-foaming agents such as silicone polymers, corrosion, friction, and oxidation inhibitors, e. g., alkyl phenols, allophanates, alkyl phosphates, and salts thereof, blooming agents, and the like. These auxiliary additives may be used in amount varying from 0.05% to about 5% by weight.

In order to demonstrate the utility and improved properties of fuel oil and lubricating oil compositions of this invention tests were made on them in accordance with the following test procedures. The results of the tests are given in Table I, where a No. 3 fuel oil was used and an SAE 30 lubrication was used in Table II.

A. Fuel oil tests:
  I. Screen Clogging Test (Shell Method Series 632/52)
  II. London Heat Test (Shell Method Series 260/52)
  III. Water Haze Test (1% of water added to fuel oil composition, mix and time noted for oil to clarify)
  IV. Leaching test (10% of water is added to fuel oil composition, mix, aqueous layer and scuff removed and process repeated until polymeric additive has been found to be leached out of the fuel oil).

B. Lubricating oil tests:
  I. Pour point—ASTM Specification D–396–39T
  II. High-Temperature Detergency Test—Ind. and Eng. Chem., vol. 44, 1834, 1952
  III. High-Temperature Detergency Test—Note description of test below
  IV. Chevrolet Low-Temperature Sludge Test—Note description of test below.

The high-temperature detergency (Test B–III) is determined by measuring the electrical resistance of a dispersion of 15% by weight carbon dispersed in a test oil. The "degree of deflocculation" is calculated as the ratio of resistance of the given system to the resistance of an undoped oil containing the same amount of carbon black, and at a constant temperature.

The test procedure for the Chevrolet Low-Temperature Sludging Test (B–IV) was as follows:

*Test procedure*

(1) Engine operated at idle for ½ hour for engine and cycling mechanism adjustment.
(2) Engine and oil pan coolant circulated over Dry Ice until jacket coolant temperature=0° F. and dipstick oil temperature=20° F.
(3) Engine operated on cycling schedule for ½ hour (15 cycles). After ½ hour of cycling, coolant temperature reaches typical normal operating level of 150–160° F.
(4) After engine stops, coolant is circulated with city water cooling coil in coolant tank until coolant-out temperature=100° F.
(5) Coolant then circulated over Dry Ice until jacket coolant temperature=0° F. and dipstick oil temperature=20° F.
(6) Cycling schedule is repeated for ½ hour (15 cycles).
(7) After last cycle of 15 hours of cycling operation, city water cooling coil is inserted in coolant tank and operation continued at constant speed and load as follows for three hours:
  Engine speed=1600 R. P. M. (30 M. P. H.)
  Dynamometer load=30 lb. (10.6 B. H. P.)
  Maximum dipstick oil temp.=185° F.
  Maximum coolant out temp.=165° F.
(8) After 3 hours of cruise (15–18 hours test time) cooling and cycling schedule repeated, as in (2) to (6) above, for 6 hours (18–24 hours test time).
(9) After last cycle at 24 hours, 3 hours of cruise is repeated as in (7) above, (24–27 hours test time).

TABLE I

| Additives | Test I | Test II | | | | | | | Test III | Test IV |
|---|---|---|---|---|---|---|---|---|---|---|
| | Screen Clogging (SMS 632/52) Initial Δ mm. | Steamed for 16 hrs. at 212° F. Δ mm. after 6 Mos. | London Heat Test (SMS 260/52) | | | | | | Water Haze Test (Hrs. to clr at Rm. Temp.) | Leaching Resistance |
| | | | 0 Hrs. | 14 Hrs. | 48 Hrs. | Asphaltic, mg./liter | Color | Asphaltened, mg./liter | | |
| None | 38 | failed after 6 weeks. | 3 | 4½ | 5 sediment. | 92 | 5 Sediment. | 226 | 72 | 1 |
| 50 p. p. m. Ex. I, 20 p. p. m. 2,4,6 tri-(dimethylaminomethyl) phenol. | 2 | 1 | 3 | 4 | ½ | 73 | 5 | 169 | 48 | 13+ |
| 10 p. p. m. Ex. I, 10 p. p. m. 2,4,6 tri-(dimethylaminoethyl) phenol, 5 p. p. m. N,N′-di-salicylidene 1,2 diamino propane. | 1 | 1 | 2 | 2½ | 3 | 53 | 4½ | 180 | 48 | 13+ |
| 10 p. p. m. Ex. XI, 20 p. p. m. tri-n-butylamine, 5 p. p. m. N,N′-disalicylidene 1,2 diamino propane. | 2 | | 2 | 3 | 3½ | 53 | 4 | 185 | 48 | 13+ |
| 10 p. p. m. Ca petroleum sulfonate, 5 p. p. m. N,N′-di-salicylidene 1,2 diamino propane. | 2 | 2 after 8 weeks | 2 | 3½ | 42 Sediment. | 108 | 4½ Sediment. | 280 | 96+ | 7 |
| 10 p. p. m. Ca naphthenate, 40 p. p. m. Ca petroleum sulfonate, 5 p. p. m. N,N′-di-salicylidene 1,2 diamino propane. | 2 | do | 2½ | 3 | 3½ | 96 | 4 Sediment. | 188 | 96+ | 7 |

When various amounts ranging from 10 to 100 p. p. m. of the copolymer products of Examples I, II, IX to XIII, XIX and XXI, are incorporated in various fuel oils, e. g., No. 2 or No. 3 fuel oil and similarly tested by the foregoing fuel oil tests I–IV beneficial results are obtained as a result of the presence of the copolymer additives.

TABLE II.—LUBRICATING OIL TESTS

| Test | I | II | III | IV |
|---|---|---|---|---|
| Additive | PP, °F., D-396-39T | High Temp. Oxidation Test, 250 cc., time (Min.) at 260° C., no cat. | High Temp. Detergency Test (degree of defloccu-lation) | Chevrolet Low Temp. Sludge Test (gm. of Sludge) |
| None (East Texas 250 Neutral mineral oil) | +20 | | | |
| 0.5%, Ex. XI | −15 | | | |
| 0.5%, Ex. XII | −20 | | | |
| 0.5%, Ex. XIII | −10 | | | |
| 0.5%, Ex. XXI | −5 | | | |
| None (SAE 30 Min. Oil) | | 26 | | |
| 1%, Ex. XII | | 35.2 | | |
| 2%, Ex. XII+1.4% Zn dialkyl dithiophosphate | | 45.6 | | |
| 1.5% SA* basic Ca petroleum sulfonate | | 21 | | |
| SAE 30 Mineral Oil+1.5% SA* Ca Salt of Octyl phenolform-aldehyde condensation product | | | 20 | |
| 0.2% SA* basic Ca petroleum sulfonate | | | 8 | |
| 2% Copolymer of vinyl acetate/octadecene (not hydrolyzed) | | | 2.8 | |
| 2%, Ex. XII | | | 2,000 | |
| 2%, Ex. XXI | | | 2,000 | |
| SAE 30 Mineral Oil | | | | 400 |
| 1.5% SA* Ca salt of octylphenol-formaldehyde | | | | 460 |
| 2%, Ex. XII | | | | 40 |
| 2%, Ex. XX | | | | 49 |

*SA=sulfate ash.

When various amounts range from about 0.01% to about 10% of the copolymer products of Examples I through XXI are incorporated in various mineral oils such as SAE 10, 20, 30, 10–W–30, oil and similarly tested by the foregoing lubricating oil tests I–IV, beneficial results are obtained as a result of the copolymer additives.

This application is a continuation-in-part of our application Serial No. 357,374, filed May 25, 1953, now abandoned.

We claim as our invention:

1. An improved hydrocarbon oil composition comprising a major amount of a hydrocarbon oil having incorporated therein a minor amount sufficient to impart stability and detergency to said hydrocarbon oil of a high molecular of from about 4,000 to 50,000 hydrolyzed copolymer of an α-hydrocarbon-olefin having at least 10 carbon atoms with a vinyl ester of a low fatty acid having from 1 to 5 carbon atoms, in the mol ratio of from 1/1 to 1/5, respectively.

2. An improved hydrocarbon oil composition comprising a major amount of a hydrocaron oil having a boiling point above 500° F. having incorporated therein a minor amount, sufficient to impart stability and detergency to said hydrocarbon oil of a high molecular weight of from 4,000 to 50,000 of a hydrolyzed copolymer of an α-hydrocarbon-olefin containing from 10 to 40 carbon atoms with a vinyl ester of a lower fatty acid of up to five carbon atoms, in the mol ratio of from 1/1 to 1/5, respectively.

3. An improved hydrocarbon oil composition comprising a major amount of a hydrocarbon oil having a boiling point above 500° F. having incorporated therein a minor amount, sufficient to impart stability and detergency to said hydrocarbon oil of a high molecular weight of from 4,000 to 50,000 of a hydrolyzed copolymer of α-hydrocarbon-olefin containing from 12 to 30 carbon atoms with a vinyl ester of a lower fatty acid of up to five carbon atoms, in the mol ratio of from 1/1 to 1/5, respectively.

4. An improved oil composition comprising a major amount of a liquid hydrocarbon oil having a boiling point above 500° F. having incorporated therein a minor amount, sufficient to impart stability and detergency to said hydrocarbon oil of a high molecular weight of from 4,000 to 50,000 of a hydrolyzed copolymer of an α-hydrocarbon-olefin containing from 12 to 30 carbon atoms with vinyl acetate, in the mol ratio of from 1/1 to 1/5, respectively.

5. An improved fuel oil composition comprising a major amount of a fuel oil and a minor amount, sufficient to color stabilize and inhibit clogging of a 4,000 to 50,000 molecular weight hydrolyzed copolymer of an α-hydrocarbon-olefin containing from 12 to 30 carbon atoms with vinyl acetate, in the mol ratio of from 1/1 to 1/5, respectively.

6. An improved fuel oil composition comprising a major amount of a fuel oil and a minor amount, sufficient to color stabilize and inhibit clogging, of a 4,000 to 50,000 molecular weight hydrolyzed copolymer of a C16–C18 α-hydrocarbon-olefin with vinyl acetate, in the mol ratio of from 1/1 to 1/5, respectively.

7. An improved fuel oil composition comprising a major amount of a fuel oil and a minor amount sufficient to color stabilize and inhibit clogging, of a 4,000 to 50,000 molecular weight hydrolyzed copolymer of α-octadecene with vinyl acetate, in the mol ratio of from 1/1 to 1/5, respectively.

8. An improved fuel oil composition comprising a major amount of fuel oil and a minor amount sufficient to color stabilize and inhibit clogging, of a 4,000 to 50,000 molecular weight hydrolyzed copolymer of an α-hexadecene with vinyl acetate, in the mol ratio of from 1/1 to 1/5, respectively.

9. An improved mineral lubricating oil composition comprising a major amount of mineral lubricating oil and a minor amount sufficient to impart detergency to said oil of a 4,000 to 50,000 molecular weight hydrolyzed copolymer of an α-hydrocarbon-olefin containing from 12 to 30 carbon atoms with vinyl acetate, in the mol ratio of from 1/1 to 1/5, respectively.

10. An improved mineral lubricating oil composition comprising a major amount of mineral lubricating oil and a minor amount, sufficient to impart detergency to said oil of a 4,000 to 50,000 molecular weight hydrolyzed copolymer of $C_{16}$–$C_{18}$ α-hydrocarbon-olefin with vinyl acetate, in the mol ratio of from 1/1 to 1/5, respectively.

11. An improved mineral lubricating oil composition comprising a major amount of mineral lubricating oil and a minor amount sufficient to impart detergency to said oil of a 4,000 to 50,000 molecular weight hydrolyzed copolymer of an α-octadecene with vinyl acetate, in the mol ratio of from 1/1 to 1/5, respectively.

12. An improved mineral lubricating oil composition comprising a major amount of a mineral lubricating oil and a minor amount sufficient to impart detergency to said oil of a 4,000 to 50,000 molecular weight hydrolyzed copolymer of an α-hexadecene with vinyl acetate, in the mole ratio of from 1/1 to 1/5, respectively.

13. The compositions of claim 5 containing a minor amount of a metal deactivator and a minor but color-stabilizing amount of an alkylamine.

14. The compositions of claim 6 containing a minor amount of a metal deactivator and a minor but color-stabilizing amount of an alkylamine.

15. The composition of claim 7 containing a minor amount of a metal deactivator and a minor but color-stabilizing amount of an alkylamine.

16. The composition of claim 8 containing a minor amount of a metal deactivator and a minor but color-stabilizing amount of an alkylamine.

References Cited in the file of this patent

UNITED STATES PATENTS

| | | |
|---|---|---|
| 2,660,563 | Banes | Nov. 24, 1953 |
| 2,737,496 | Catlin | Mar. 6, 1956 |

OTHER REFERENCES

"A New Class of Polymeric Dispersants for Hydrocarbon Systems" presented at the 125 National Meeting, American Chemical Society, Mar. 23 to Apr. 1, 1954, page 3.